United States Patent [19]

Boon

[11] 4,207,279
[45] Jun. 10, 1980

[54] PROCESS AND APPARATUS FOR CONTINUOUS PRODUCTION OF POLYURETHANE FOAM

[75] Inventor: Derk J. Boon, University Research Park, N.C.

[73] Assignee: Reeves Brothers, Inc., New York, N.Y.

[21] Appl. No.: 962,166

[22] Filed: Nov. 20, 1978

Related U.S. Application Data

[63] Continuation-in-part of Ser. No. 793,286, May 3, 1977, Pat. No. 4,158,032.

[51] Int. Cl.² .......................................... B29D 27/04
[52] U.S. Cl. .................................. 264/54; 264/51; 264/DIG. 84; 425/329; 425/517 C
[58] Field of Search ................. 264/DIG. 84, 51, 54; 425/329, 817 C

[56] References Cited

U.S. PATENT DOCUMENTS

| | | | |
|---|---|---|---|
| 3,325,573 | 6/1967 | Boon et al. ........................ | 264/54 |
| 3,325,823 | 6/1967 | Boon ................................. | 264/41 |
| 3,560,599 | 2/1971 | Ferstenberg ..................... | 264/DIG. 84 |
| 3,734,668 | 5/1973 | Porter .............................. | 264/DIG. 84 |
| 3,786,122 | 1/1974 | Berg ................................ | 264/DIG. 84 |
| 3,840,629 | 10/1974 | Marjoram ...................... | 264/DIG. 84 |
| 3,870,441 | 3/1975 | Petzetakis ...................... | 264/DIG. 84 |
| 3,887,670 | 6/1975 | Porter ............................. | 264/DIG. 84 |
| 4,074,960 | 2/1978 | Dockray et al. ................ | 264/DIG. 84 |
| 4,102,621 | 7/1978 | Talbert ........................... | 264/DIG. 84 |

FOREIGN PATENT DOCUMENTS

| | | | |
|---|---|---|---|
| 2135672 | 2/1973 | Fed. Rep. of Germany ... | 264/DIG. 84 |
| 1433757 | 4/1976 | United Kingdom ............ | 264/DIG. 84 |

*Primary Examiner*—Philip Anderson
*Attorney, Agent, or Firm*—Pennie & Edmonds

[57] ABSTRACT

A process and apparatus are disclosed for the continuous production of polyurethane foam. The invention is directed to the use of a laterally translating mold, the first portion of which has divergent side walls, including a "V"-shaped mold having divergent straight vertical side walls. A polyurethane reaction mixture is deposited at or near the apex of that mold. The deposited mixture can be a partially-expanded prefoamed fluid mixture formed, for example, by a centrifugal mixing means. Typically, the mixture is permitted to substantially complete its rise after being conveyed past the extremeties of the divergent side walls of the first mold portion. The invention contemplates use of a ratio of conveyor velocity to foam product height lower than those of the prior art. Both rectangular and circular cross sectional products can be produced.

18 Claims, 8 Drawing Figures

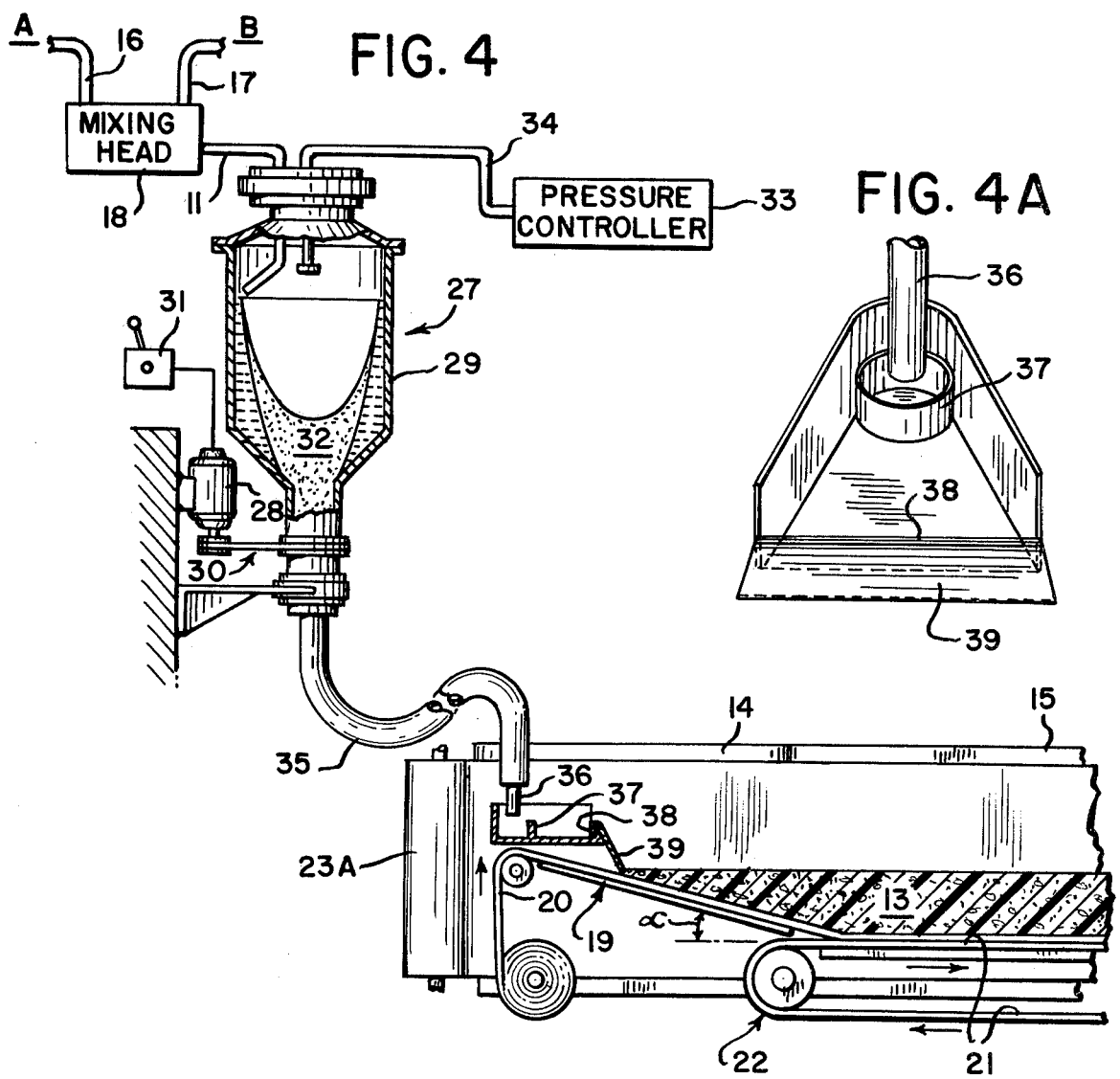
FIG. 4
FIG. 4A
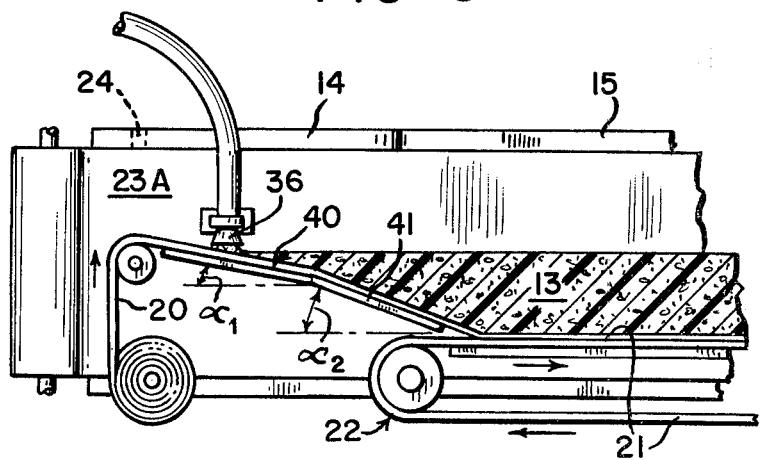
FIG. 5

PROCESS AND APPARATUS FOR CONTINUOUS PRODUCTION OF POLYURETHANE FOAM

CROSS REFERENCE TO PARENT APPLICATION

This application is a continuation-in-part of Ser. No. 793,286 filed on May 3, 1977, now U.S. Pat. No. 4,158,032, issued on June 12, 1979.

TECHNICAL FIELD

The present invention relates to the continuous production of cast polyurethane foams, such as rigid, semi-rigid and flexible polyurethane foams.

BACKGROUND ART

Polyurethane foams are widely used as materials from which articles such as mattresses, seat cushions, and thermal insulators are fabricated. Such polymeric foam materials are ordinarily manufactured by a casting process in which a mixture of liquid polyurethane-foam-generating reactants are deposited in a mold. As used herein, the term "mold" includes both stationary molds for batch casting and translating or otherwise movable molds for continuous casting. Evolution of a gas causes the reactants to foam. For some foam formulations, the reactants themselves react to evolve sufficient gas; in others a blowing agent is mixed with the reactants to provide gas evolution. Continued gas evolution causes the foam to expand to fill the mold. The foam, initially a partially expanded fluid mixture, becomes increasingly viscous as the reactants polymerize, ultimately curing into a polyurethane foam casting shaped by the mold.

Slabs of polyurethane foam approximately rectangular or circular in cross section are conventionally cast in a translating channel-shaped mold. Such molds typically include a belt conveyor forming the bottom of the mold and a pair of spaced-apart, opposing side walls, which can be fixed or translatable at the speed of the conveyor. The mold sides and bottom are generally lined with one or more sheets of flexible-web such as kraft paper or polyethylene film. The sheets of mold liner are ordinarily withdrawn from rolls and continuously translated along the mold channel at the same speed as the belt of the conveyor. Liquid-foam-generating reactants are deposited on the mold bottom in a zig-zag pattern from a pouring nozzle positioned above the mold which is reciprocated back and forth across the width of the mold. Typically, after the reactants flow together, they expand and form a uniform slab of foam. Conventional production of foam products having rectangular and circular cross sections is taught in U.S. Pat. No. 3,325,823 to Boon and U.S. Pat. No. 3,325,573 to Boon et al., respectively. The disclosures of those patents are incorporated by reference.

If fresh reactant mixture is deposited on top of foam generated from previously deposited reactants, the resulting cured foam will have an uneven surface and non-uniform density, which is undesirable for most applications. By continuously translating the mold liner, the reactant mixture is continuously carried away from the pouring area below the pouring nozzle, which reduces the tendency for fresh reactant mixture to cover that previously deposited.

Propitious selection of conveyor velocity can prevent production of undesirable foam products. A range of velocities can be established for a particular reactant mixture formulation. Minimum velocity is achieved when liquid reactant mixture is evenly distributed on the bottom of the mold and does not flow in a direction opposite to that of the mold and conveyor. Maximum velocity is achieved when the deposited liquid mixture begins to flow in the same direction as the conveyor.

Selection of a velocity within the mentioned range requires consideration of the chemical reaction occurring subsequent to the depositing of liquid mixture in the mold. During residence in the mold, liquid mixture foams and cures. The height of the foam is affected by conveyor velocity. Because economy necessitates maximum product height, lower velocities are preferred during the foaming portion of the reaction to attain such heights. The ratio of conveyor velocity to product height is a useful criterion for evaluating process efficiency, i.e. the lower the ratio, the more efficient the process. According to the process of this invention, that ratio can be reduced to the range of about 1 to about 3.

To reduce further the tendency of the liquid reactants to flow back under the pouring nozzle and to assist the "zig-zags" of reactant mixture to merge uniformly, it is customary to incline a pouring board, the surface under the nozzle, from horizontal so that the bottom liner slopes downward in the direction of translation. However, the angle of inclination of the pouring board cannot be greater than about 4.5° from horizontal for typical flexible polyether polyurethane-foam formulations without causing the reactant mixture to flow forward under previously deposited mixture, which leads to undesirable nonuniform foam. The angle of inclination is different for different foam formulations, such as polyester polyurethane foams.

Problems arise if the mold bottom slopes downward along its entire length. Conventional continuous slab molds are quite long, typically in excess of 60 feet, to provide for the long curing time of the foam. Building a translatable mold of this length inclined from horizontal is significantly more expensive than building a translatable mold of the same length which is horizontal, because, for example, the building housing the inclined mold would be required to have higher than normal ceilings. Moreover, it is expensive to change the angle of inclination of the entire mold to compensate for differing viscosities among various foam formulations. Thus, some continuous slab molds have horizontal belt conveyors for most of the length of the mold bottom, but have relatively short inclined pouring boards located beneath the pouring nozzles. The expansion and rise of the foam generally takes place on the sloping pouring board.

A second reason for providing a pouring board which makes an angle with respect to the belt conveyor relates to the cross-sectional shape of the slab cast in the mold. As the foam expands and rises in the mold, it encounters the sides of the mold. If the mold-side liners are being translated substantially parallel to the mold bottom, the expanding foam experiences a shear force which resists its rise along the sides. This shear force results in a rounding of the top of the slap to form a crown or crest of convex shape, much like a loaf of bread. For most applications, such rounded portions are unusable and must be discarded as scrap. Thus, the more nearly rectangular the cross section of the slap, i.e., the flatter the top, the more economical is the casting process.

If, over the length the foam expands, the mold bottom liner and the two mold side liners are translated at an angle with respect to one another, the mold side liner can have a velocity component relative to the mold bottom in the direction of the expansion of the foam. This velocity component can compensate for the shear force which resists the rise of the foam. Guiding the mold bottom liner across an inclined pouring board, which intersects an inclined mold-bottom conveyor can provide such a compensating velocity component when foam expansion occurs over the length of the pouring board and when mold-side liners are translated parallel to the mold-bottom conveyor. The angle of intersection, which ordinarily leads to polyurethane foam slabs having the most nearly rectangular cross sections, is about 10° for typical foam formulations and production conditions. Unfortunately, if the pouring board is sloped 10° from horizontal freshly deposited reactant mixture tends to flow forward, as discussed above, leading to foam slabs of non-uniform density or other imperfections.

Although it is possible to construct a continuous slab mold with a pouring board inclined from horizontal by an angle of 4.5° and intersecting the belt conveyor at 10°, the belt conveyor in such a case must be inclined upward by an angle of 5.5°. See, for example, the apparatus of U.S. Pat. No. 3,325,823. As noted above, however, inclined translatable molds are more expensive than comparable horizontal molds.

U.S. Pat. No. 3,786,122 discloses a process for producing polyurethane foam slabs which employs a horizontal, channel-shaped mold having at its forward end an inclined "fall plate" which makes an angle of significantly greater than 4.5° from horizontal. The problem of reactant mixture flowing down the inclined fall plate is obviated by prereacting the reactant mixture prior to introducing it onto the fall plate. The prereacting step is carried out in a trough which opens onto the upper edge of the fall plate. Liquid foam reactants are introduced onto the bottom of the trough and the foam which is generated is allowed to expand upwards in the trough and spill over onto the fall plate. The foam continues to expand as it is carried down along the fall plate by a translating bottom sheet. Because the prefoamed reactant mixture exiting the trough is more viscous than the initial liquid reactant mixture, the fall plate can be inclined at a greater angle from horizontal than a pouring board in a conventional polyurethane foam slab mold.

An additional result of introducing prefoamed reactant mixture into the mold is that relatively high foam slabs can be produced as compared with conventional processes. Economies result from producing high slabs because, the thicker the foam slab, the less is the loss from discarding rind which generally coats polyurethane foam castings. With a conventional slab mold, if the rate of introduction of reactant mixture is kept constant and the rate of translation of the mold liner is reduced, the height of the foam slab tends to increase because more foam-generating reactant is deposited per unit length. However, if the rate of translation is slowed sufficiently, the expanding foam, particularly the youngest and most fluid portion, becomes unstable and tends to slip and shift, which results in cracks and other imperfections in the cured foam.

This problem of instability of rising foam is reduced in the process of the U.S. Pat. No. 3,786,122 by introducing into the translating mold prefoamed reactant mixture which is sufficiently viscous as to be able to sustain a relatively steep slope of the pouring board as it completes its expansion. Thus, the height of the foam can be increased. In addition to permitting higher foam slabs to be cast by reducing the translation speed of the mold liner, this process permits the use of slab molds shorter than those of conventional processes, because the slab moves a shorter distance during the curing time.

Certain problems attend the use of the open trough of the U.S. Pat. No. 3,786,122. For example, changing the width of the trough is difficult because foam deposits interfere with re-establishing fluid-tight seals. Moreover, the trough opening is subject to partial blockage by deposits of cured foam along the back and sides where the flow of prefoamed reactant mixture stagnates. Such deposits break free from time to time and are swept over the weir into the rising foam, thereby causing objectionable non-uniformities in the foam slab. A further difficulty is encountered when air bubbles are introduced into the bottom of the trough with the liquid reactants. These air bubbles generally remain entrained in the foam, leading to voids and other defects in the cured material.

U.S. Pat. No. 3,870,441 discloses an apparatus for producing polyurethane foam slabs which uses a horizontal, channel-shaped mold similar to the apparatus disclosed in the U.S. Pat. No. 3,786,122. Likewise, liquid foam reactants are introduced into the bottom of the trough and allowed to expand upward eventually spilling over onto a fall plate. The expanding foam moves across the fall plate to a conveyor via a translating bottom sheet. The improvement of the U.S. Pat. No. 3,870,441 is directed to a means for assisting the expanded foam in spilling over the fall plate. That flow assisting means comprises translating sheets, substantially perpendicular to the bottom sheet, which continuously move around the periphery of the channel-shaped mold including the periphery of the trough. However, that improvement to the U.S. Pat. No. 3,786,122 does not alleviate all of the drawbacks noted above for the U.S. Pat. No. 3,786,122.

DISCLOSURE OF INVENTION

The present invention is directed to a process and apparatus for the production of polyurethane foam products. The invention contemplates the use of a unique laterally translating mold arrangement having the ability to achieve high block heights or greater diameter round block foams. Specifically, that mold arrangement contains a first mold portion with diverging side walls, particularly a "V"-shaped mold portion with diverging straight vertical side walls. The angle of the diverging side walls is not critical, but should be less than about 120°, preferably within the range of 10° to 90°. The angle referred to is defined by imaginery lines from the apex of the first mold portion to the point of intersection of the diverging side walls with the parallel second side wall portions of the mold. Reaction mixture is deposited at the apex of the "V" and substantially completes its expansion shortly past the extremeties of the "V" which join parallel side walls of a conventional mold arrangement. A centrifuge (as described in co-pending Ser. No. 793,286 filed on May 3, 1977 and now U.S. Pat. No. 4,158,032) can advantageously be employed to deposit a partially-expanded prefoamed mixture of reactants. The mixture can be deposited on a segmented pouring board. Use of the present invention results in low ratios of conveyor velocity to product height as compared with substantially higher ratios used in prior art processes and apparatus.

BRIEF DESCRIPTION OF DRAWINGS

Several preferred embodiments of the invention are described below with reference to the accompanying drawings, in which:

FIG. 4 is also an elevation and partial section of a modification of FIG. 1 wherein the polyurethane foam reactants are passed from a conventional mixing head into a prefoaming means and then deposited on a device depicted in great detail in FIG. 4A, which device is suspended below the mixing head and above the pouring board as a partially-expanded prefoamed mixture of reactants;

FIG. 4A is a frontal view of the device in FIG. 4 on which the partially-expanded prefoamed mixture of reactants is deposited;

FIG. 5 is also an elevation and partial section of a modification of FIG. 4 wherein a segmented pouring board is depicted having a first and second segment inclined at angles α-1 and α-2 from horizontal, respectively;

BEST MODE FOR CARRYING OUT THE INVENTION

Figure 1:
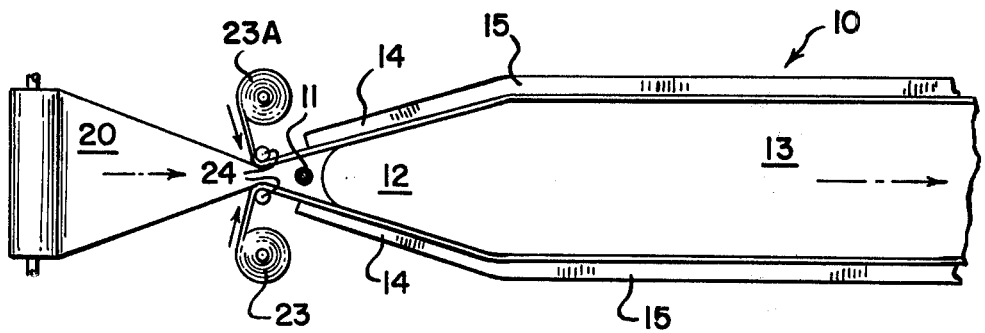
FIG. 1 is a plan view of an apparatus of the present invention used for producing polymeric foam products utilizing a mold having a "V" shape.

Referring now to FIG. 1, and apparatus 10 for producing products of free-rising polyurethane foam is illustrated. The foam product will have a substantially rectangular cross section (See. U.S. Pat. No. 3,325,823 to Boon); however, this apparatus could be modified to make a foam product with a substantially circular cross section according to the teachings of the U.S. Pat. No. 3,325,573 to Boon et al. Such apparatus is suitable for use with the process of the present invention. The apparatus includes a conduit 11, which can be stationary or can reciprocate, depending upon the necessity for distributing the premixed reactants near the apex of the "V" shaped first portion 12 of a continuously translating mold 13. The latter second portion of mold 13 includes a conventional arrangement for producing a product having the desired shape with a conventional bottom conveyor means to translate the expanding and curing polyurethane foam and parallel side walls which can be either moving or stationary. The "V"-shaped portion includes the first mold portion side walls 14 which diverge and cannot be parallel or convergent. Those first mold portion side walls of the "V"-shaped portion joint at their extremeties the second mold portion parallel side walls 15 comprising the latter second portion of the mold 13.

Figure 2:
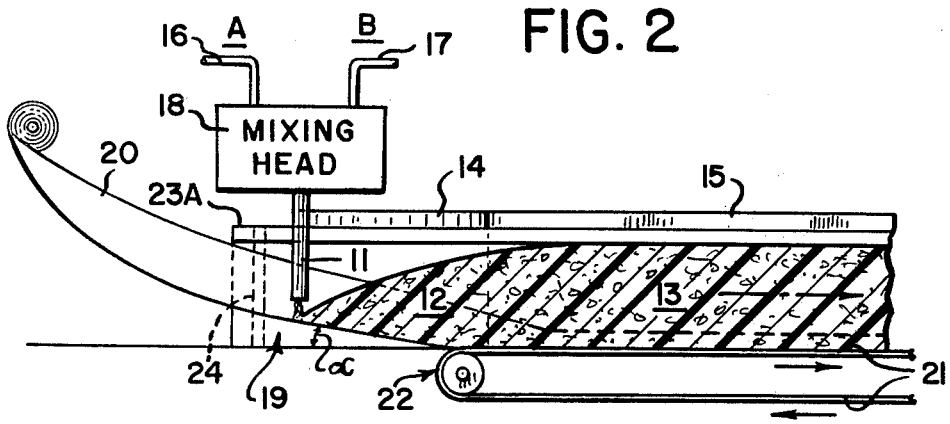
FIG. 2 is an elevation and partial section of the embodiment of FIG. 1 wherein a conventional mixing head is used to deposit polyurethane reactants on a pouring board inclined at an angle α from horizontal near the apex of the "V" portion of the mold.

FIG. 2 shows conduits 16 and 17 which simultaneously convey a mixture of polyurethane foam forming reactants to a conventional mixing head 18 connected to conduit 11 for depositing premixed reactants on pouring board 19. A mold bottom liner 20 made of a flexible-web, such as Kraft paper, is supplied from a roll shown in the drawing and is guided over pouring board 19 onto a mold bottom surface 21 of a bottom belt conveyor 22.

First and second side mold-side liners 23 and 23A, also made of a flexible-web, such as Kraft paper, are guided past opposing guide means 24 and then translate across the first portion mold side-walls 14 of the "V" shaped first mold portion 12 and then past second mold portion side walls 15 of mold 13. Mold side liners 23 are positioned flat against mold side walls 14 and 15 by the pressure of the expanding, premixed polyurethane foam forming reactants. The mold side liners and mold bottom liner define a channel-shaped mold for casting foam products, which can have substantially rectangular or substantially circular cross sections. Means are provided for guiding and translating the side liners and bottom liner in a parallel relationship. Of course, the rate of translation of the three liners should be substantially equal to the rate of translation of belt conveyor 22.

Pouring board 19 can be substantially flat or curved and makes an angle α from the horizontal. The angle of inclination α can be adjusted to accommodate variations in the viscosity of the mixture being deposited thereon.

Figure 3:
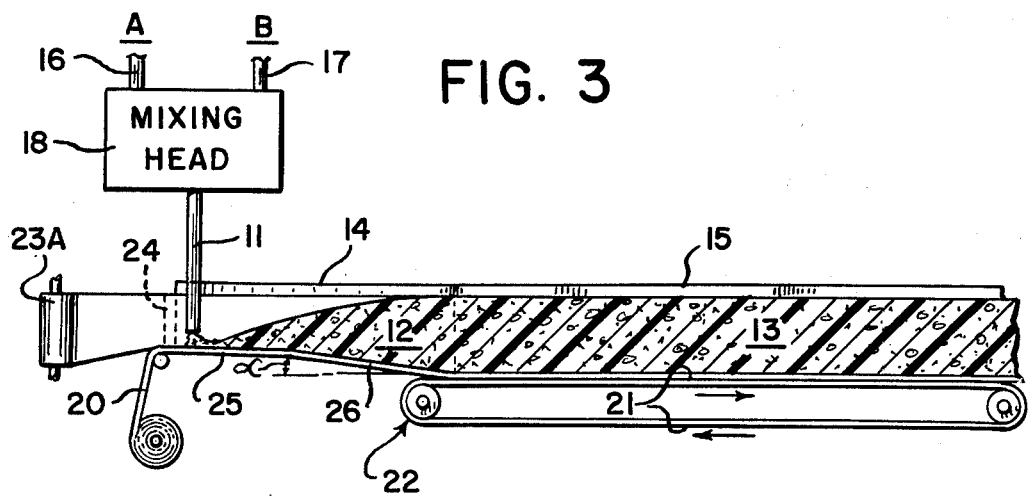
FIG. 3 is also an elevation and partial section of a modification of FIG. 1 wherein the segmented pouring board is depicted having a first horizontal segment followed by a second segment inclined at an angle α from horizontal.

Although a one angle pouring board 19 is illustrated in FIGS. 1 and 2, in certain applications it can be advantageous to employ pouring boards having more than one segment such as that shown in FIG. 3, each segment being inclined at a different angle from horizontal, or, as in FIG. 3 with a first segment horizontally arranged. FIG. 3 shows a pouring board consisting of two segments, a first horizontal segment 25 located adjacent conduit 11 and a second inclined segment 26 abutting first segment 25 and adjacent to belt conveyor 22 inclined at an angle α from horizontal. Such a pouring board arrangement has been used to make foam products of substantially rectangular and substantially circular cross sections. Other segmented pouring boards are of course within the bounds of the instant invention.

FIG. 4 depicts a further modification of FIG. 1 employing a prefoaming means 27 used in making a partially expanded prefoamed mixture of polyurethane foam forming reactants to be deposited on pouring board 19. Prefoaming means 27 is illustrated as a top centrifuge such as those described in U.S. patent application Ser. No. 793,286, filed May 3, 1977. Other prefoaming means useful in the practice of the present invention are the cone-shaped prefoaming means alone or in conjunction with the bottom centrifuge depicted in FIGS. 6 and 6A; in this regard reference is made again to copending application Ser. No. 798,286. As previously described, conduits 16 and 17 simultaneously transport polyurethane foam reactants into mixing head 18. Premixed reactants exit mixing head 18 through conduit 11 which comprises the inlet for prefoaming means 27, which is illustrated in this instance as a top centrifuge.

When prefoaming means 27 includes a top centrifuge, a variable speed electric motor 28 is used to rotate container 29 by way of a pully drive 30. A motor speed control 31 varies the speed of motor 28. Accordingly, mixed reactants enter through inlet tube 11 to rotating pressurized container 29 to form a partially-expanded polymeric mixture 32.

A gas atmosphere can be maintained over mixture 32. The pressure of that atmosphere is controlled at a predetermined value by a conventional gas pressure controller 33 which is connected to container 29 by conduit 34. That pressure propels the partially-expanded mixture through flexible conduit 35 to a dispensing nozzle 36. Flexible conduit 35 directs the partially-expanded mixture from the interior of the container 29 to the apex of the "V"-shaped portion 12 of mold 13. Nozzle 36 is positioned above pouring board 19 near the apex of the "V"-shaped portion of the mold. Advantageously, a circular reservoir 37 and a weir 38 combination is positioned below nozzle 36; this combination is depicted in greater detail by FIG. 4A. The nozzle can be stationary or be reciprocated cross-wise of mold 13 across the width of the apex of the "V"-shaped portion 12 by conventional reciprocation means. An edge of the pouring board 19 abuts a surface of a conventional belt conveyor 22, which is used to form a mold bottom surface 21. That surface is preferably substantially horizontal. Otherwise, the apparatus operates in a manner previously described with regard to FIG. 1.

The circular reservoir 37 and weir 38 combination depicted by FIG. 4A is employed to further control the spread of the partially-expanded prefoamed mixture of reactants onto the pour board 19. That combination also contains a lip 39 over which the partially-expanded prefoamed mixture of reactants passes before running onto the pour board 19.

Although a one segment pouring board 19 is depicted in FIG. 4, in certain applications it can be advantageous to employ a multi-segmented pouring board such as that shown in FIG. 5, each segment being inclined at a different angle from horizontal. FIG. 5 shows a pouring board consisting of two segments, a first segment 40 located adjacent to pouring nozzle and having an angle $\alpha 1$ from horizontal and a second segment 41 abutting first segment 40 and adjacent belt conveyor 22, having an angle $\alpha 2$ from horizontal. Again, further multiple-segmented pouring boards are within the scope of the instant invention.

Figure 6:
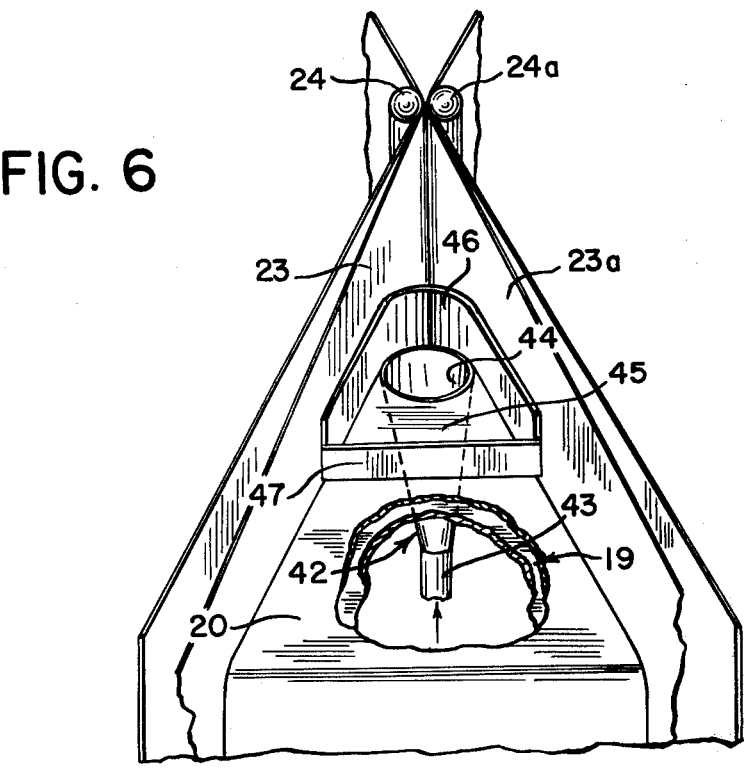
FIG. 6 is a frontal view of the modification of FIG. 1, wherein the polyurethane foam-forming reactants are passed into a cone-shaped bottom prefoaming means and then deposited on the pouring board by flowing out of the cone-shaped prefoaming means as a partially-expanded prefoamed mixture of reactants.

FIG. 6 shows a frontal view of the modification of the apparatus depicted by FIG. 1, wherein a cone-shaped bottom prefoaming means 42 is employed to deposit the partially-expanded prefoamed mixture of reactants onto the pouring board 19. In that cone-shaped bottom prefoaming means (depicted separably by FIG. 6A), the partially-expanded prefoamed mixture of reactants is introduced from below the pouring board 19 through conduit 43; thereafter the mixture exits from the opening 44 and flows into the reservoir 45 formed by the back and side wall 46 and the front weir 47. Thereafter the partially-expanded prefoamed mixture of reactants moves onto pouring board 19, above which a mold bottom liner 20 made of a flexible web, such as Kraft paper, passes. The first and second side wall liners 23 and 23a, also made of a flexible web such as Kraft paper, are guided past opposing guide means 24 and 24a. The bottom mold liner 20 and first and second side wall liners 23 and 23a thereafter pass over the surface 21 of the bottom belt conveyor 22.

Figure 6A:
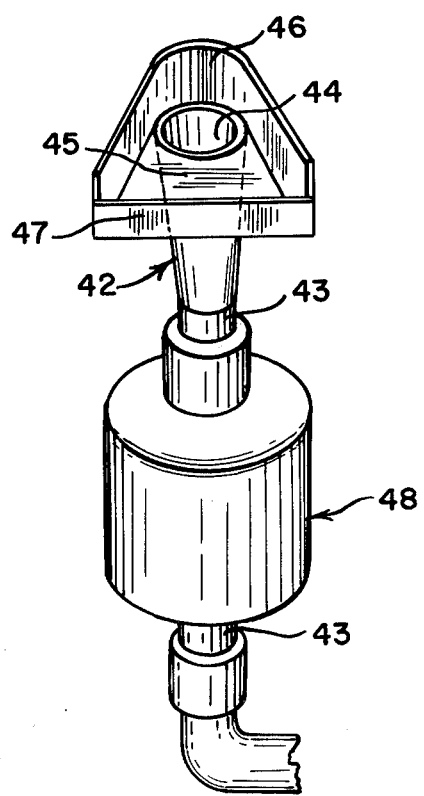
FIG. 6A is a frontal view of the cone-shaped prefoaming means ulitized in the apparatus depicted in FIG. 6 used in conjunction with an upstream or bottom centrifuge.

FIG. 6A depicts separably the cone-shaped bottom prefoaming means employed in FIG. 6. FIG. 6A also contains reference to a bottom centrifuge 48 which has been employed advantageously in combination therewith.

In accordance with the process of the subject invention, a first component A and a second component B enter mixing head 18 simultaneously. These components are premixed using a conventional mixing head and can either be deposited directly on pouring board 19 by conduit 11 or can enter prefoaming means 27 where a partially-expanded prefoamed mixture 32 is formed and then be subsequently deposited via nozzle 36 on the pouring board. Conduit 11 and nozzle 36 can either be stationary or be reciprocated. The mixture is normally deposited at a constant rate near the apex of the "V" shaped portion 12 of mold 13. The components of the mixture continue to react, expand and cure to form a polyurethane foam product. The deposited mixture continuously translates along with the mold liners and the conveyor. The conveyor normally translates at a constant velocity. Typical foam formulations used in the subject invention are exemplified hereinafter.

EXAMPLES

The following examples are illustrative of the ease with which polyurethane foam products can be produced in accordance with the process of the present invention.

EXAMPLE I

A slab of polyurethane foam was cast continuously using a conventional mixing head illustrated in FIG. 1. The following formulation was mixed in the head and deposited near the apex of the "V"-shaped portion of the mold:

EXAMPLE I

| | weight % | weight % | g/min |
|---|---|---|---|
| Component A | | | |
| Dow Polyol CP 3140 (3700 MV copolymer of ethylene oxide and propylene oxide, made by Dow Chemical Company) | 65.05 | 65.05 | 3,470 |
| Master Batch I: | | | |
| Dow Polyol CP 3140 | 32.45 | | |
| BF 2370 (Silicone surfactant made by Goldschmidt Chemical Company) | 0.75 | | |
| Water | 4.00 | | |
| A-1 (70% solution of bis (di methylaminoethyl) ether in di propylene glycol, made by Union Carbide Company) | 0.10 | | |
| | 37.30 | 37.30 | 1,990 |
| Master Batch II: | | | |
| Dow Polyol CP 3140 | 2.50 | | |
| C-6 (33 ⅓% T-9) (33 ⅓% solution of stannous octaote in Dioctyl Phthalste made by Witco Chemical Company) | 0.75 | | |
| | 3.25 | 3.25 | 173 |
| Component B | | | |
| TD-80 (Toluene diisocyanate 80/20 2,4/2,6 isomer ratio, made by Mobay Chemical) | 50.00 | 50.00 | 2,667 |
| | | 155.60 | 8,300 (18.26 |

EXAMPLE I-continued

|  | weight % | weight % | g/min (lb/min) |
|---|---|---|---|

The ingredients of component A, comprising the polymer component, were premixed and pumped by a single stream into the mixing head. Component B, comprising the toluene diisocyanate component, was separately and simultaneously pumped into the head. The two components were mixed at ambient temperature. The feed rate of the blended components was 8,300 grams/minute or 18.26 pounds/minute. The resulting mixture was deposited at a constant rate near the apex of the "V"-shaped portion of the mold. The first mold side walls of the "V"-shaped portion were 44 inches in length and were spaced apart 25 inches at the point wherein they joined second mold side walls. The angle between the divergent side walls in this instance is therefore about 33°. The expanded mixture moved down a segmented pouring board similar to that depicted in FIG. 3. The first segment of the pouring board was inclined at an angle 0° from the horizontal while the second segment was inclined at an angle 17° from the horizontal. The segmented pouring board abutted a conveyor inclined upwardly at an angle 3° from the horizontal. The constant velocity of the conveyor was 4.29 ft/min. Consonant with FIG. 3, the mold was channel-shaped with parallel side walls lined with Kraft paper which paper moved at the same velocity as the conveyor. A substantially rectangular polyurethane foam product was produced having a density of 1.65 pounds/cubic foot and having a height of 19.2 inches. The ratio of conveyor velocity to product height was about 2.7.

EXAMPLE II

Example I was repeated using a lower feed rate and a different reactant formulation:

|  | weight % | weight % | g/min |
|---|---|---|---|
| Component A |  |  |  |
| Dow Polyol CP 3140 | 77.13 | 77.13 | 3,470 |
| Master Batch I: |  |  |  |
| Dow Polyol CP 3140 | 20.37 |  |  |
| BF-2370 | 0.75 |  |  |
| Water | 4.00 |  |  |
| A-1 | 0.10 |  |  |
|  | 25.22 | 25.22 | 1,135 |
| Master Batch II: |  |  |  |
| Dow Polyol CP 3140 | 2.50 |  |  |
| C-6 (33 ⅓% T-9) | 0.75 |  |  |
|  | 3.25 | 3.25 | 146 |
| Component B |  |  |  |
| TD-80 | 50.00 | 50.00 | 2,249 |
|  | 155.60 |  | 7,000 (15.4 lb/min) |

The feed rate of the reactants was 15.4 pounds/minute, and the velocity of the conveyor was 3.41 feet/minute. A quality foam product was produced having a rectangular cross section and having a height of 15.9 inches. The ratio of conveyor velocity to product height was about 2.6.

EXAMPLE III

A slab of polyurethane foam was cast continuously using a centrifugal prefoaming means similar to that illustrated in FIG. 4. The following formulation was mixed in the prefoaming means:

|  | weight % | weight % | g/min |
|---|---|---|---|
| Component A |  |  |  |
| Dow Polyol CP 3140 | 75.00 | 75.00 | 7,160 |
| Master Batch I: |  |  |  |
| Dow Polyol CP-3140 | 22.50 |  |  |
| BF 2370 | 0.80 |  |  |
| Water | 4.00 |  |  |
| A-5 | 0.03 |  |  |
|  | 27.33 | 27.33 | 2,609 |
| Master Batch II: |  |  |  |
| Dow Polyol CP-3140 | 2.50 |  |  |
| C-6 (33 ⅓% T-9) | 0.57 |  |  |
|  | 3.07 | 3.07 | 293 |
| Component B |  |  |  |
| TD-80 | 50.00 | 50.00 | 4,773 |
|  |  | 155.40 | 14,835 (32.6 lb/min) |

The ingredients of component A, comprising the polyol component, were premixed and pumped as a single stream into a conventional mixing head. Component B, comprising the toluene diisocyanate component, was separately and simultaneously pumped into that head. Then the two components were mixed at ambient temperature. The mixed components were then fed into a centrifugal prefoaming means to form a partially-expanded polyurethane foam mixture. That mixture was deposited near the apex of the "V"-shaped portion of the mold at a constant feed rate of 14,835 grams/minute. First mold side walls of the "V" were 60 inches in length and were spaced 46 inches apart; the angle between the side portions of the "V"-shaped mold is, therefore, about 45°. The pouring board, upon which the partially-expanded mixture was deposited, contained 3 segments: a first segment inclined at 15°, a second segment inclined at 0°, and a third segment inclined at 13°. The pouring board abutted a conveyor which was upwardly inclined at an angle of 3°. The latter portion of the mold was channel-shaped with parallel side walls spaced apart about 46 inches. The mold was lined with Kraft paper which translated at a constant velocity. Utilizing the formulation and feed rate mentioned above, a number of experiments were conducted wherein the velocity of the conveyor was varied. The results are tabulated below:

TABLE

| Experiment Number | Conveyor Velocity (Vc) ft/min | Product Height (H) inches | Ratio (Vc x 12)/H |
|---|---|---|---|
| 1 | 2.75 | 17.2 | 1.92 |
| 2 | 2.93 | 16.16 | 2.18 |
| 3 | 3.02 | 16.65 | 2.18 |
| 4 | 3.02 | 16.10 | 2.25 |
| 5 | 3.34 | 16.5 | 2.43 |
| 6 | 3.34 | 16.95 | 2.36 |
| 7 | 3.34 | 16.15 | 2.48 |
| 8 | 3.61 | 16.55 | 2.62 |
| 9 | 4.10 | 17.6 | 2.79 |

TABLE-continued

| Experiment Number | Conveyor Velocity (Vc) ft/min | Product Height (H) inches | Ratio (V$_c$x 12)/H |
|---|---|---|---|
| 10 | 4.38 | 18.0 | 2.92 |

The ratio varied from about 1.9 to about 2.9.

EXAMPLE IV

Experiment I was repeated using a similar polyurethane formulation with an increased feed rate of 32.6 pounds per minute:

| Component A | weight % | weight % | g/min |
|---|---|---|---|
| Dow Polyol CP 3140 | 75.00 | 75.00 | 7,160 |
| Master Batch I: | | | |
| Dow Polyol CP-3140 | 22.50 | | |
| BF 2370 | 0.80 | | |
| Water | 4.00 | | |
| A-5 | 0.07 | | |
| | 27.37 | 27.37 | 2,613 |
| Master Batch II: | | | |
| Dow Polyol CP-3140 | 2.50 | | |
| C-6 (33⅓% T-9) | 0.57 | | |
| | 3.07 | 3.07 | 299 |
| Component B | | | |
| TD-80 | 50.00 | 50.00 | 4,773 |
| | | 155.44 | 14,845 (32.6 lb/min) |

First mold side walls of the "V"-shaped portion of the mold were 60 inches in length and spaced apart 46 inches at the point where they joined the latter portion of the mold (i.e. α =about 45°). The expanded mixture moved down a segmented pouring board: a first segment inclined at 15°, a second segment inclined at 0°, a third segment inclined at 3°, and a fourth segment inclined at 18°. The segmented pouring board abutted a conveyor inclined upwardly at an angle of 3°. The velocity of the conveyor was 4.0 feet/minute, and the height of the rectangular foam slab was 15.5 inches, which resulted in a ratio of the conveyor velocity to the product height of about 3.2.

EXAMPLE V

Example III was repeated for round block production using a tunnel-shaped portion for the latter portion of the mold. The following polyether formulation was mixed in the prefoaming means:

| Component A | weight % | weight % | g/min |
|---|---|---|---|
| Dow polyol CP-3140 | 64.968 | 64.968 | 3,470 |
| Master Batch I: | | | |
| Dow Polyol CP-3140 | 32.522 | | |
| BF 2370 | 0.800 | | |
| Water | 4.000 | | |
| A-5 | 0.030 | | |
| | 37.352 | 37.352 | 1,995 |
| Master Batch II: | | | |
| Dow Polyol CO-3140 | 2.50 | | |
| C-6 (33⅓% T-9) | 0.57 | | |
| | 3.070 | 3.070 | 64 |
| Component B | | | |
| TD-80 | 50.000 | 50.000 | 2,671 |
| | | 155.390 | 8,300 (16.26 lb/min) |

First mold side walls had length of 44 inches and were spaced 23 inches apart. The pouring board was segmented having a first segment inclined at 6°, and a second segment inclined at 15°. The pouring board abutted the conveyor which was inclined upwardly at an angle of 3°. Circular foam products were obtained having a diameter of 22 inches. The velocity of the conveyor varied from 2.13 feet/minute to 4.19 feet/minute with attendant ratios of about 1.1 and about 2.2, respectively.

Overall, it should be noted that certain free-rising polyester-derived polyurethane foam formulations may be too sensitive to mechanical stresses to be employed in the present invention.

It is not intended to limit the present invention to the specific embodiments described above. Other changes may be made in the process and apparatus specifically described herein without departing from the scope and teachings of the instant invention, and it is intended to encompass all other embodiments, alternatives and modifications consistant with the present invention.

I claim:

1. In a process for continuously molding free-rising polyurethane foam in a continuous, laterally translating open top mold at a given bottom conveyor velocity by depositing a polyurethane foam forming mixture of reactants at a given feed rate on a pouring board, the improvement comprising increasing the height of the molded flexible polyurethane foam product obtained by (i) depositing said polyurethane foam forming mixture of reactants near the apex of a first mold portion of the laterally translating mold, which first portion of said laterally translating mold has divergent first side walls which form an angle therebetween of more than about 10° and less than about 120° and which join, at their extremeties, the parallel second side walls of a second portion of said translating mold, and (ii) allowing said polyurethane foam forming mixture of reactants to substantially complete its rise after traversing past said first portion of the translating mold.

2. The process of claim 1 wherein the ratio of the conveyor velocity to the foam product height is from about 1 to about 3.

3. The process of claim 1 wherein said polyurethane foam forming mixture of reactants is deposited in partially-expanded, prefoamed form between the divergent vertical side walls of the first mold portion.

4. The process of claim 3 wherein said polyurethane foam forming mixture of reactants is deposited in a partially-expanded, prefoamed form from a centrifuge prefoaming means.

5. The process of claim 3 wherein said polyurethane foam forming mixture of reactants is deposited in a partially-expanded, prefoamed form from a cone-shaped prefoaming means.

6. The process of claim wherein said polyurethane foam is a polyester-derived polyurethane foam.

7. The process of claim 1 wherein the deposited mixture of reactants translates across a segmented pouring board having a horizontal first segment.

8. The process of claim 1 or 7 wherein the deposited mixture of reactants translates across a pouring board having at least one segment downwardly inclined toward the second portion of the translating mold.

9. The process of claim 1 wherein a continuous slab is molded having a substantially rectangular cross section.

10. The process of claim 1 wherein a continuous slab is molded having a substantially circular cross section.

11. In an apparatus for producing free-rising polyurethane foam including:
   (a) means for mixing liquid polyurethane foam-generating reactants;
   (b) means for depositing the mixed reactants in a laterally-translating mold; and
   (c) a continuous, open top mold, which includes:
      (1) a bottom belt conveyor extending laterally for translating a foam product;
      (2) a laterally translating mold whose bottom surface is adjacent the belt conveyor; and
      (3) a pouring board disposed between side walls of the mold having an elevated edge adjacent said depositing means which extends to the mold bottom surface;

the improvement which consists essentially of employing a stationary depositing means to deposit the mixture of polyurethane foam forming reactants near the apex of a first open top mold portion having divergent first side walls which form an angle therebetween of more than about 10° and less than about 120° and which join, at their extremeties, the parallel second side walls of a second portion of said translating mold.

12. The improvement of claim 11 wherein a prefoaming means is employed in combination with the depositing means so that, when deposited, the mixture of polyurethane foam forming reactants is in the partially-expanded prefoamed state.

13. The improvement of claim 12 wherein the prefoaming means is a centrifuge.

14. The improvement of claim 12 wherein the prefoaming means is a cone-shaped bottom prefoaming means.

15. The improvement of claim 11 wherein the pouring board is segmented.

16. The improvement of claim 15 wherein the pouring board has a first horizontal segment adjacent said depositing means followed by an inclined second segment.

17. The improvement of claim 11 wherein the second mold portion is rectangular.

18. The improvement of claim 11 wherein the second mold portion is circular.

* * * * *